(12) United States Patent
Arrabi et al.

(10) Patent No.: US 10,217,280 B2
(45) Date of Patent: Feb. 26, 2019

(54) IDENTIFYING PRIMITIVES IN INPUT INDEX SYSTEM

(71) Applicant: Advanced Micro Devices, Inc., Sunnyvale, CA (US)

(72) Inventors: Saad Arrabi, Orlando, FL (US); Mangesh P. Nijasure, Orlando, FL (US); Todd Martin, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 83 days.

(21) Appl. No.: 15/354,513

(22) Filed: Nov. 17, 2016

(65) Prior Publication Data
US 2018/0137676 A1 May 17, 2018

(51) Int. Cl.
| | |
|---|---|
| *G06T 1/20* | (2006.01) |
| *G06T 15/80* | (2011.01) |
| *G06T 17/20* | (2006.01) |
| *G06T 15/00* | (2011.01) |

(52) U.S. Cl.
CPC ............. *G06T 17/20* (2013.01); *G06T 1/20* (2013.01); *G06T 15/005* (2013.01); *G06T 15/80* (2013.01); *G06T 2210/52* (2013.01)

(58) Field of Classification Search
None
See application file for complete search history.

(56) References Cited

U.S. PATENT DOCUMENTS

| | | |
|---|---|---|
| 2013/0169635 A1 | 7/2013 | Carroll et al. |
| 2014/0078156 A1 | 3/2014 | Carroll et al. |
| 2017/0178401 A1* | 6/2017 | Agrawal ................. G06T 17/10 |
| 2017/0262954 A1* | 9/2017 | Arntzen .................... G06T 1/20 |

FOREIGN PATENT DOCUMENTS

GB      2 548 120 A     9/2017

OTHER PUBLICATIONS

Anonymous: "Vertex Rendering—OpenGL Wiki", Retrieved from the Internet: URL: https://www.khronos.org/opengl/wiki/Vertex_Rendering, 13 pages.

* cited by examiner

*Primary Examiner* — Yingchun He
(74) *Attorney, Agent, or Firm* — Volpe and Koenig, P.C.

(57) ABSTRACT

Techniques for removing reset indices from, and identifying primitives in, an index stream that defines a set of primitives to be rendered, are disclosed. The index stream may be specified by an application program executing on the central processing unit. The technique involves classifying the primitive topology for the index stream as either requiring an offset-based technique or requiring a non-offset-based technique. This classification is done by determining whether, according to the primitive topology, each subsequent index can form a primitive with prior indices (e.g., line strip, triangle strip). If each subsequent index can form a primitive with prior indices, then the technique used is the non-offset-based technique. If each subsequent index does not form a primitive with prior indices, but instead at least two indices are required to form a new primitive (e.g., line list, triangle list), then the technique used is the offset-based technique.

19 Claims, 8 Drawing Sheets

IDENTIFYING PRIMITIVES IN INPUT INDEX SYSTEM

TECHNICAL FIELD

The disclosed embodiments are generally directed to graphics processing, and, in particular, to identifying primitives in an input index stream.

BACKGROUND

Hardware for rendering three-dimensional graphics accepts input that specifies primitives to be drawn to a screen. At least part of this input includes indices that refer to vertices that specify the shape, location, and attributes of a primitive. These indices typically need to be processed from a user-provided format to a format that is more suitable for use on graphics hardware. Graphics hardware is typically massively parallel because the act of rendering involves large numbers of similar but independent operations (e.g., calculating color values for different pixels, transforming positions of different vertices, or the like). To be able to provide the massively parallel processing units with sufficient load to be highly utilized, the input indices should be processed quickly and efficiently.

BRIEF DESCRIPTION OF THE DRAWINGS

A more detailed understanding may be had from the following description, given by way of example in conjunction with the accompanying drawings wherein.

DETAILED DESCRIPTION

Figure 1:
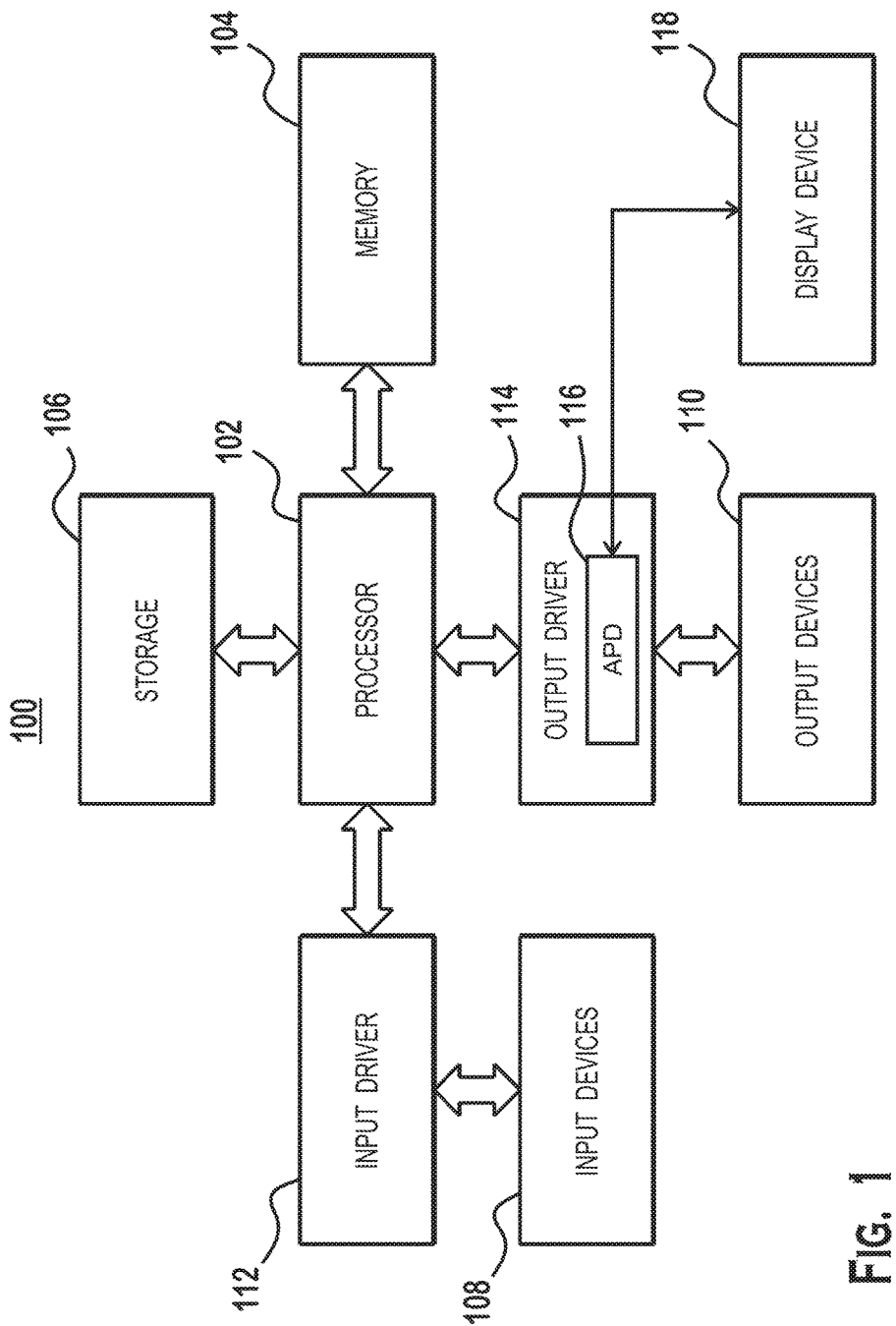
FIG. 1 is a block diagram of an example device in which one or more disclosed embodiments may be implemented.

The present disclosure is directed to techniques for removing reset indices from, and identifying primitives in, an index stream that defines a set of primitives to be rendered. The index stream may be received from a central processing unit external to a graphics card and may be specified by an application program executing on the central processing unit. The technique involves classifying the primitive topology for the index stream as either requiring an offset-based technique or requiring a non-offset-based technique. This classification is done by determining whether, according to the primitive topology, each subsequent index can form a primitive with prior indices (e.g., line strip, triangle strip). If each subsequent index can form a primitive with prior indices, then the technique used is the non-offset-based technique. If each subsequent index does not form a primitive with prior indices, but instead at least two indices are required to form a new primitive (e.g., line list, triangle list), then the technique used is the offset-based technique.

The non-offset-based technique involves identifying each grouping of indices in the index stream that could be a primitive and removing all such groupings that include the reset index. The offset-based technique is more complex and involves calculating an offset from which output primitives are obtained from the index stream. The offset is related to the positions of reset indices in the stream of indices.

To determine the offset, first a set of initial candidate primitives is identified by identifying each grouping of indices that could possibly be a primitive, according to the primitive topology, and without regards to the location of reset indices. Then, for each initial candidate primitive, the location of the newest reset index in that primitive is determined.

Locations range from 0 to the size of the primitives minus 1, beginning with the newest index. These locations are used to identify final candidate primitives. More specifically, a set of final candidate primitives is generated, each final candidate primitive corresponding to a different initial candidate primitive. Each final candidate primitive is assigned an offset equal to either the location of the reset index in the immediately preceding initial candidate primitive, or, if that initial candidate primitive had no reset index, then the offset assigned to the immediately preceding final candidate primitive.

The offsets are used to identify the indices of the final candidate primitives. More specifically, the indices of any particular final candidate primitives are identified as the indices that would result if the positions of the input indices in the input index stream were shifted towards older indices by a number of indices equal to the offset assigned to the final candidate primitive. For example, if a final candidate primitive is assigned an offset of 1, then the final candidate primitive is assigned the indices of the index stream that are one older than the indices assigned to the initial candidate primitive. In an illustrative example, if the index stream includes indices 1, R, 3, 4, 5, 6 (where "R" is the reset index), an initial candidate primitive is [4, 5, 6], and the corresponding final candidate primitive has an offset of 1, then the final candidate primitive has the indices shifted one to the left of the indices of the initial candidate primitive, which are indices 3, 4, and 5. Once final candidate primitives are obtained, those with the reset index are removed and the remainders are output primitives, output for use in the graphics processing pipeline.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
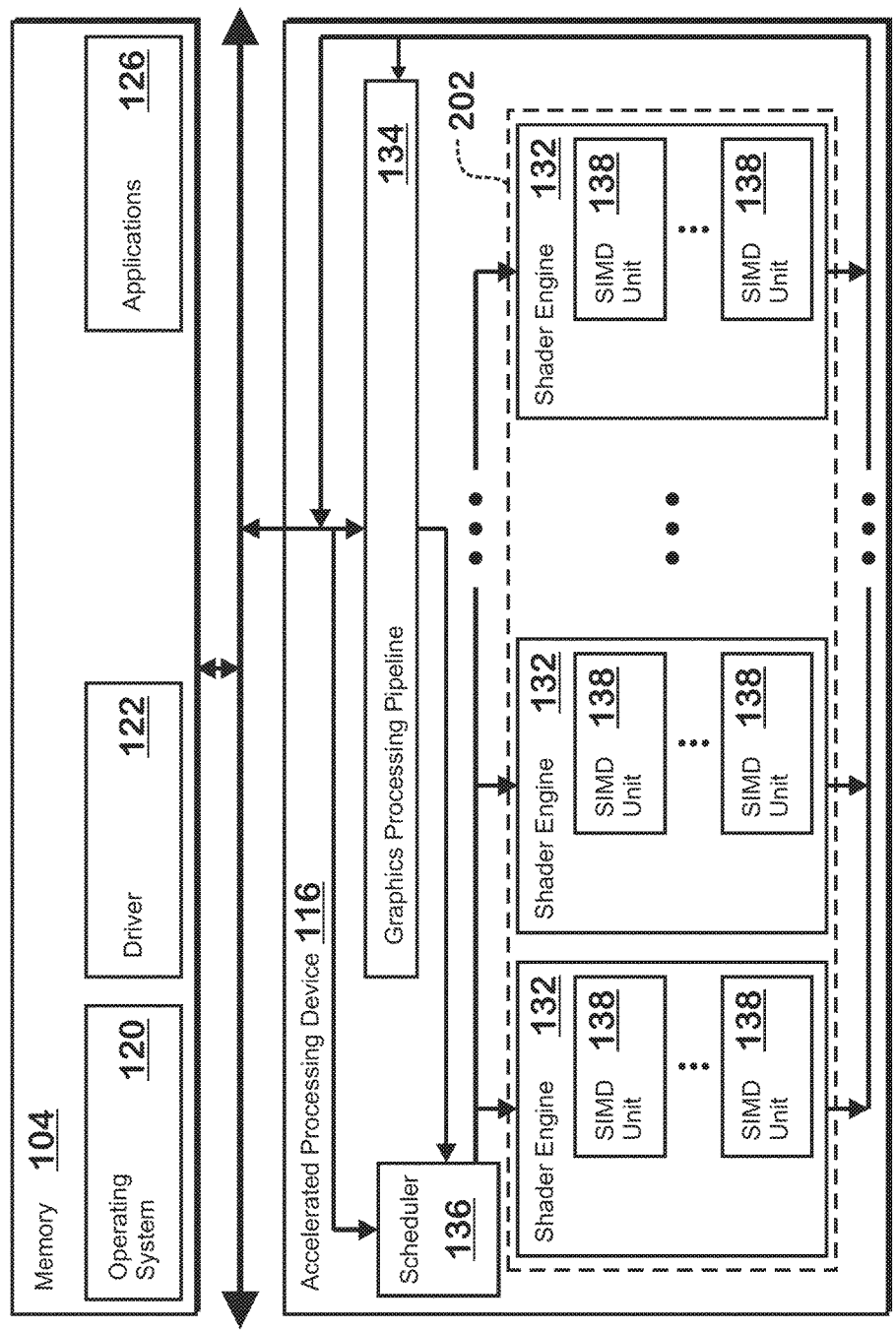
FIG. 2 is a block diagram of an accelerated processing device, according to an example.

FIG. 2 is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related (or not related) to graphics operations, such as operations related to video, physics simulations, computational fluid dynamics, or other tasks, based on commands that are received from the processor 102 or that are not part of the "normal" information flow of a graphics processing pipeline 134.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different shader engines 132 and SIMD units 138. Scheduling involves assigning wavefronts for execution on SIMD units 138, determining when wavefronts have ended, determining when wavefronts have stalled and should be swapped out with other wavefronts, and performing other scheduling tasks.

The parallelism afforded by the shader engines 132 is suitable for graphics related operations such as pixel value calculations, vertex transformations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 3:
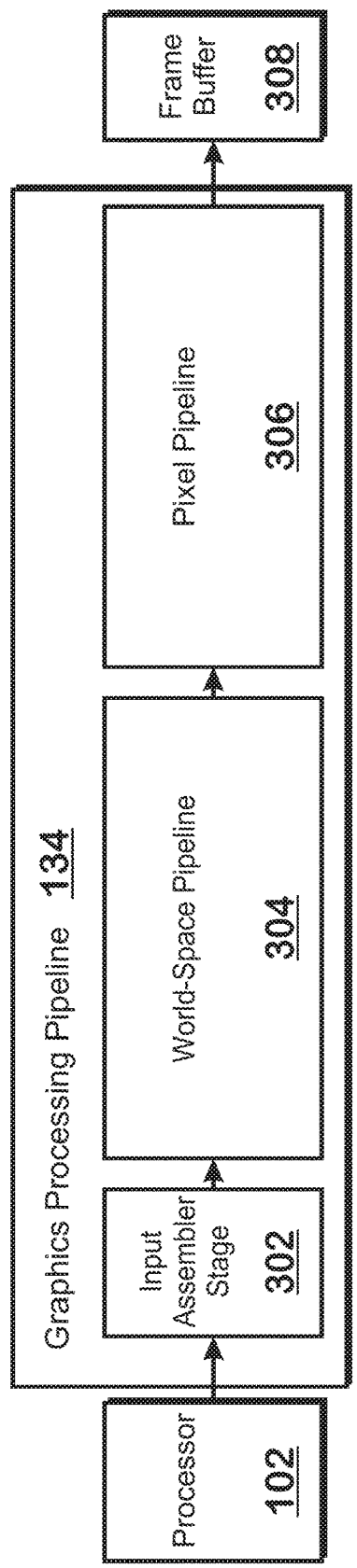
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes an input assembler stage 302, a world-space pipeline 304, and a pixel pipeline 306. The input assembler stage 302 processes and formats input received from the processor 102 for processing by the graphics processing pipeline 134. The world-space pipeline 304 performs vertex and primitive manipulation, converting objects defined in three-dimensional world-space to triangles defined in screen space. The pixel pipeline 306 processes the triangles defined in screen space to generate pixel colors for output to a frame buffer 308. Each of the input assembler stage 302, the world-space pipeline 304, and the pixel pipeline 306 can be implemented as a combination of hardware (including fixed function and programmable hardware) and software, as all hardware (including all fixed function hardware, all programmable hardware, or a combination thereof), or entirely as software executing on a hardware processor.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers.

The world-space pipeline 304 performs functionality for converting the input received from a processor 102 into a form more amenable to rendering into screen pixels. More specifically, the world-space pipeline 304 performs vertex shading functions, optional tessellation functions if tessellation is enabled, and optional geometry shading functions if geometry shading is enabled.

Vertex shading includes performing various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of vertex shading may modify attributes other than the coordinates. Vertex shading is implemented partially or fully as vertex shader programs to be executed on one or more shader engines 132. In some examples, the vertex shader programs are provided by the processor 102 and are based on programs that are pre-written by a computer programmer. The driver 122 compiles such programs to generate the vertex shader programs having a format suitable for execution within the shader engines 132. In other examples, the vertex shader programs are provided by the driver 122 directly, are stored within the APD 116, or are provided through any other technically feasible means.

Tessellation converts simple primitives into more complex primitives by subdividing the primitives. Tessellation involves generating a patch for the tessellation based on an input primitive, generating a set of samples for the patch, and calculating vertex positions for the vertices corresponding to the samples for the patch. Tessellation can be performed partially or fully by shader programs executed on the programmable processing units 202.

Geometry shading performs vertex operations on a primitive-by-primitive basis. A variety of different types of operations can be performed via geometry shading, including operations such as point sprite expansion, dynamic particle system operations, fur-fin generation, shadow volume generation, single pass render-to-cubemap, per-primitive material swapping, and per-primitive material setup. Operations for geometry shading may be performed by a shader program that executes on the programmable processing units 202.

The world-space pipeline 304 outputs primitives (typically triangles) to the pixel pipeline 306 for pixel generation and eventual writing to the frame buffer 308. The contents of the frame buffer 308 are read out to be displayed on the display device 118. The pixel pipeline 306 implements rasterization and pixel shading.

Rasterization involves determining which screen pixels (or sub-pixel samples) are covered by a particular primitive. Pixel shading involves determining output values for screen pixels based on primitives generated in the world-space pipeline 304 and the results of rasterization. Pixel shading may include applying textures from a texture memory. Operations for pixel shading may be performed by one or more shader programs that execute on the programmable processing units 202. After rasterization and shading, the pixel pipeline 306 writes results to the frame buffer 308 for display on the display device 118.

One task of the input assembler stage 302 is to identify primitives in a stream of input indices that is received from the processor 102. The indices are references to vertices that are stored in a vertex buffer. For this analysis by the input assembler stage 302, indices are used, instead of the vertices they refer to, because indices are smaller than vertices and require fewer resources (e.g., storage elements, wires, or the like) to be processed.

Identification of primitives from the input indices can act as a bottleneck for operation of the graphics processing pipeline 134 because parts of the graphics processing pipeline 134 use the data identifying primitives for various purposes and if that information is unavailable for a certain amount of time, those parts of the pipeline could be unable to perform useful work during that time.

Processing the stream of input vertices received from the processor 102 is a complex task for several reasons. The stream of input vertices is received as a stream of indices and metadata specifying a primitive topology (e.g., line list, line strip, triangle list, triangle strip, or the like) that indicates the manner in which the indices are to be interpreted to form primitives. Thus, the same set of indices can be interpreted differently based on the primitive topology specified. Moreover, the stream of indices often includes one or more reset indices, which are special index values used to help interpret the stream of input indices. Reset indices are interpreted in different ways depending on the primitive topology. These factors make identification of primitives from a stream of input indices a complex task.

This task is further complicated by the highly parallel nature of the APD 116. More specifically, it is desirable for the input assembler stage 302 to provide primitives to many shader engines 132 in parallel so that the input assembler stage 302 does not act as a bottleneck to operation of the multiple shader engines 132. Thus if the input assembler stage 302 consumes too much time identifying the primitives, then the shader engines 132 may be unable to be loaded to full capacity when performing primitive-related operations.

One technique for quickly distributing the input indices to the different shader engines 132 is to simply divide the stream of input indices into chunks having an equal number of indices and to send the chunks to different shader engines 132 for processing. One issue with this technique, however, is that, due to the varying number and positions of reset indices in any given chunk, the actual number of primitives represented by any given chunk can vary greatly. An example follows. In this example, the primitive topology is a line list. In this primitive topology, every two indices specify a different line. For example, indices 1 and 2 specify a line, indices 3 and 4 specify a line, indices 5 and 6 specify a line, and so forth. If a sequence of two indices contains the reset index, then that sequence is considered an invalid primitive. In this primitive topology, the following chunk of indices includes five lines: (In the following examples, the chunks are shown "in isolation," meaning without consideration of indices in previous or subsequent chunks. However, chunks are typically interpreted with continuity with previous or subsequent chunks. In other words, oldest indices of a particular chunk can form primitives with the newest indices of an immediately previous chunk.)

1, 2, R, 4, 5, R, 7, 8, 9, 10, 11, 12

Table 1: First example chunk of indices

In Table 1, [1, 2] is a first primitive, [4, 5] is a second primitive (R is the reset primitive), [7, 8] is a third primitive, [9, 10] is a fourth primitive, and [11, 12] is a fifth line. The following chunk of indices includes 6 primitives:

1, 2, 3, 4, 5, 6, 7, 8, 9, 10, 11, 12

Table 2: Second example chunk of indices

In Table 2, [1, 2] is a first line, [3, 4] is a second line, [5, 6] is a third line, [7, 8] is a fourth line, [9, 10] is a fifth line, and [11, 12] is a sixth line. Both the chunk of Table 1 and the chunk of Table 2 include 12 indices, but these two chunks include different numbers of primitives. This disparity illustrates how assigning equal-sized chunks of indices to different shader engines 132 for performing per-primitive processing can result in those different shader engines 132 receiving different amounts of work and thus one shader engine 132 being more idle than another shader engine 132.

Thus, techniques are provided herein for quickly identifying primitives from a stream of input indices. The techniques allow for the primitives to be identified quickly enough that the primitives can be extracted and packed for efficient parallel transmission to different shader engines 132 for processing. Two techniques, each of which is used to process different types of primitive topologies, are provided herein.

Figure 5:
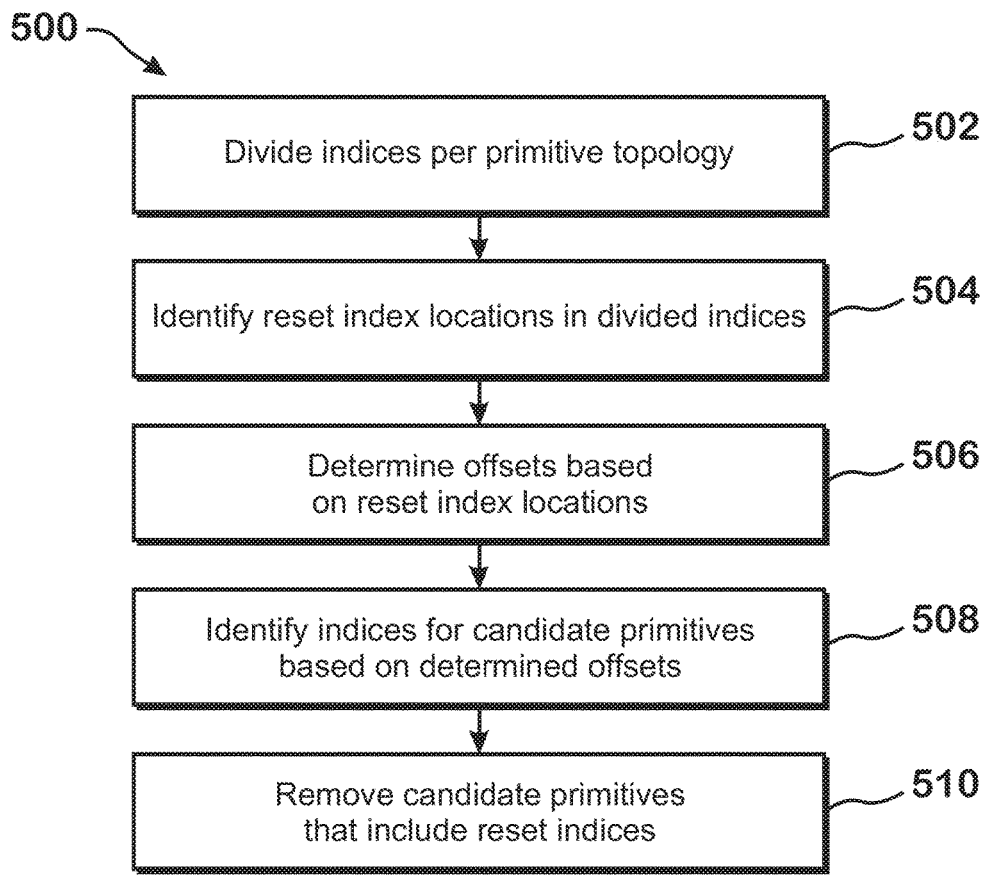
FIG. 5 is a flow diagram of a method for, given a particular primitive topology, identifying primitives from a set of indices that may include reset indices, according to an example.
Figure 6:
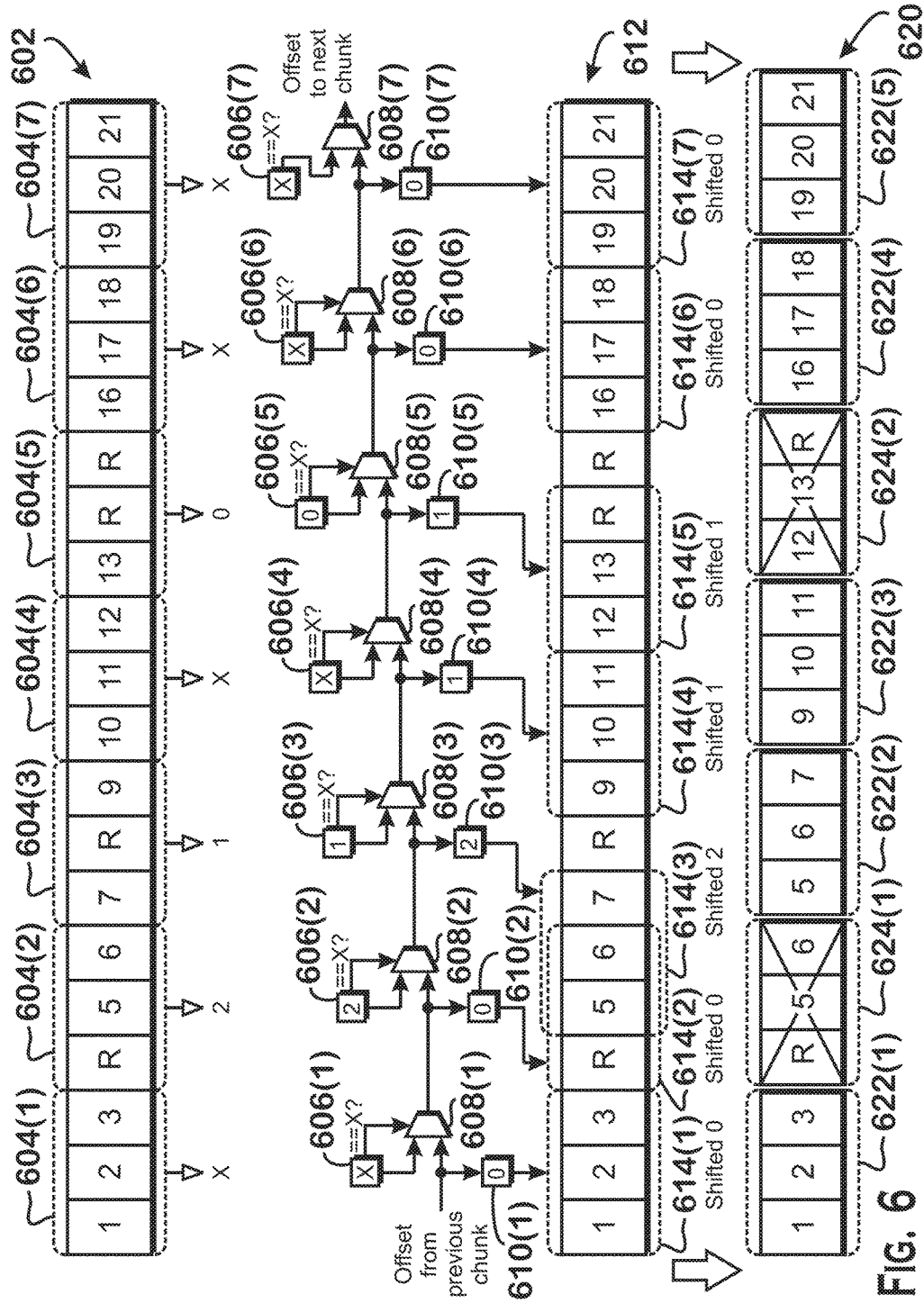
FIG. 6 illustrates an example application of an offset-based technique for identifying primitives from a chunk of indices.

A first technique, discussed below with respect to FIGS. 5 and 6, is used for primitive topologies for which every new index does not necessarily form a new primitive with previous indices. Generally, this type of primitive topology includes strip-type topologies such as line strips, triangle strips, and the like, where each subsequent index forms a primitive with the indices immediately preceding that index. Some strip-type topologies, such as quad strips, are not included in this first type of primitive topology, and some list-type topologies, such as point lists, are included in this first type of primitive topology. The first technique may be referred to herein as an "offset-based technique."

Figure 7:
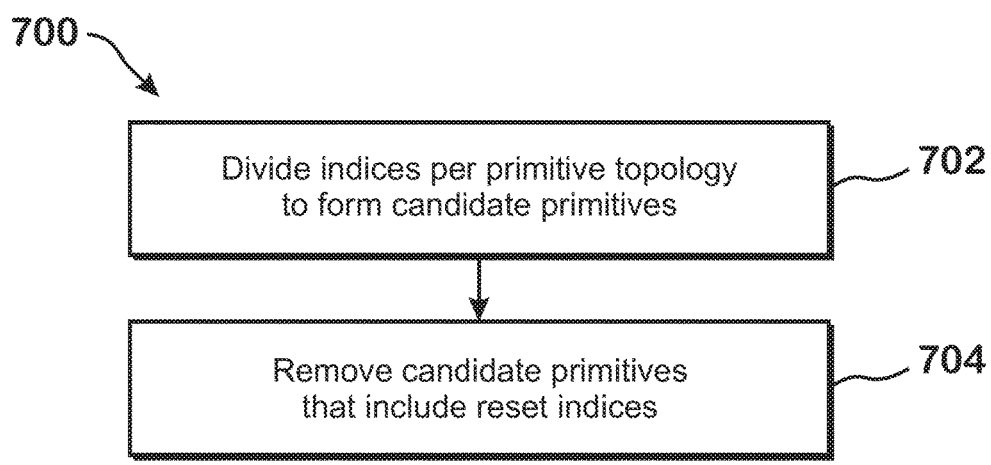
FIG. 7 is a flow diagram of a method for, given a particular primitive topology, identifying primitives from a set of indices that may include reset indices, according to an example.
Figure 8:
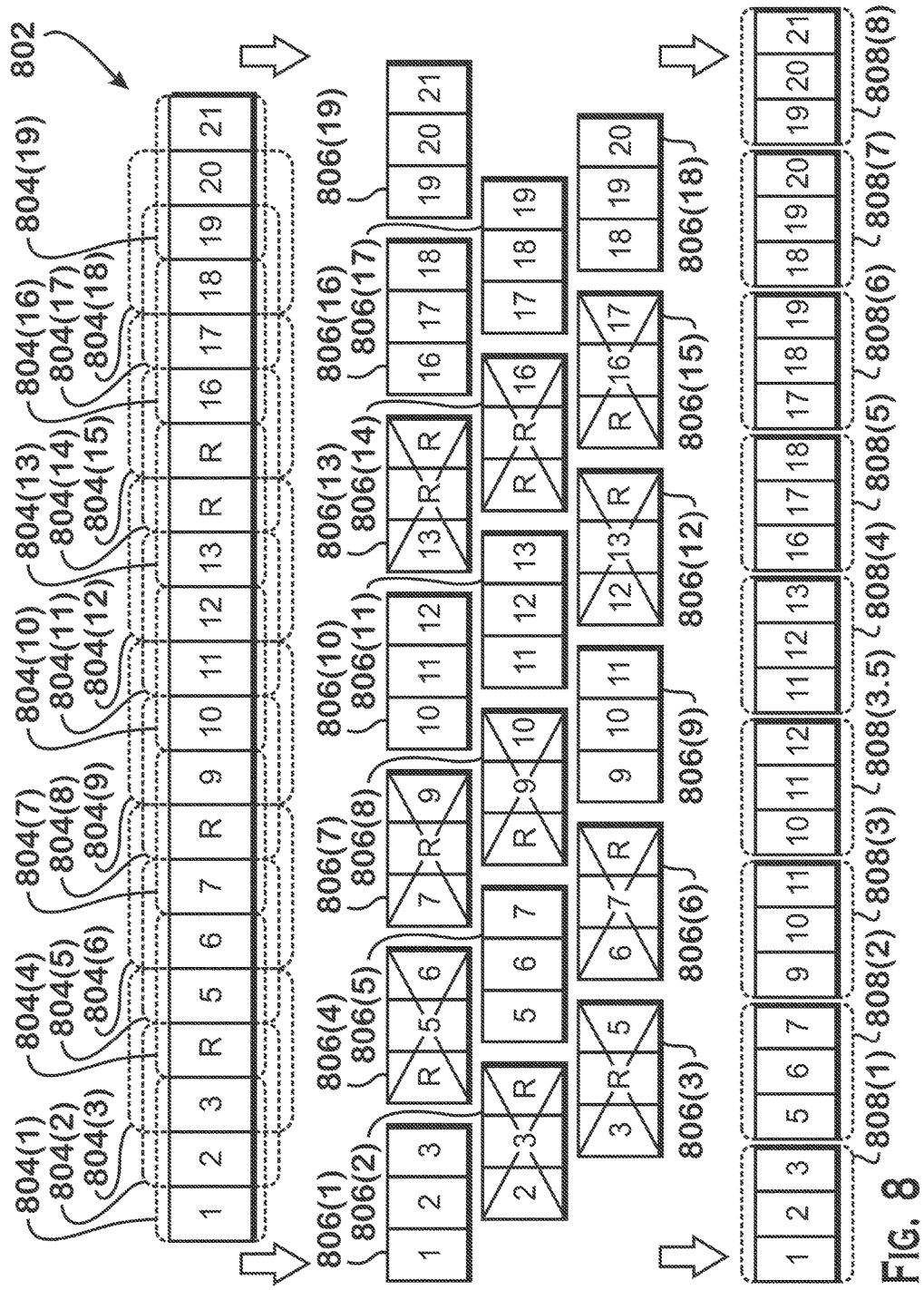
FIG. 8 illustrates an example application of a non-offset-based technique for identifying primitives from a chunk of indices.

A second technique, discussed below with respect to FIGS. 7 and 8, is used for primitive topologies for which each subsequent index in a chunk of indices has the possibility of creating a new primitive. Generally, this type of primitive topology includes list-type topologies, such as line lists, line strips, and the like. The second technique may be referred to herein as a "non-offset-based technique." The differences between these two techniques will be made more apparent with reference to the disclosure below.

Figure 4:
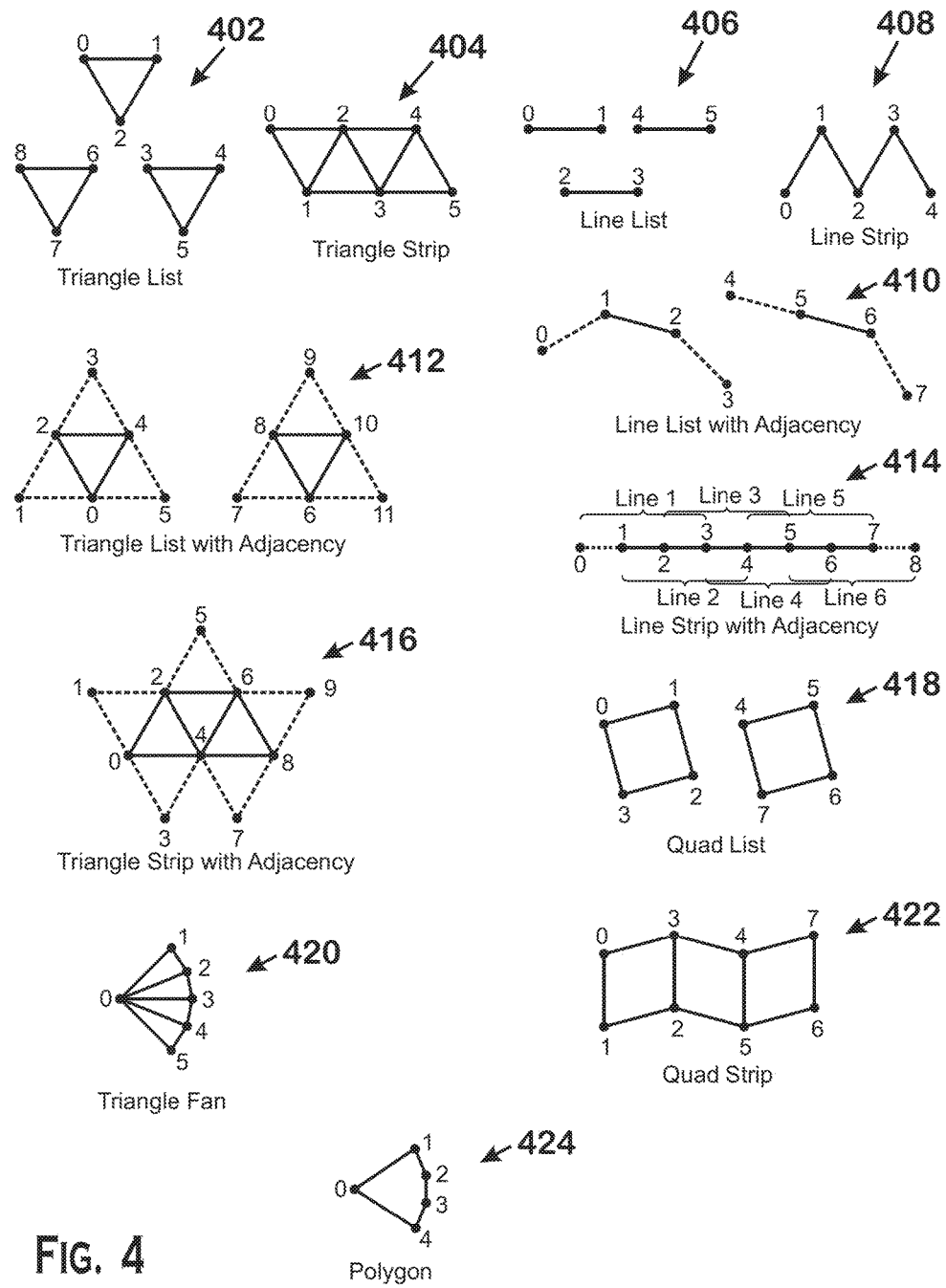
FIG. 4 is an illustration of various primitive topologies, according to examples.

FIG. 4 is an illustration of various primitive topologies, according to examples. The primitive topologies do not include every possible primitive topology, but include many of the most commonly used topologies. Those of skill in the art would be able to apply the principles and techniques described herein to other primitive topologies. Each primitive topology shown illustrates a number of vertices. The numerals illustrated for each vertex are indices that refer to the vertices. For purposes of clarity in illustrating primitive topologies, the reset index is not discussed with respect to FIG. 4. However, one or more reset indices included in the sequences of indices presented below would change the way in which those sequences were interpreted.

The triangle list topology 402 is a topology in which each sequence of three indices defines a different triangle. Thus, the sequence of indices 0, 1, 2, 3, 4, 5, 6, 7, 8 defines three triangles: triangle [0, 1, 2], triangle [3, 4, 5], and triangle [6, 7, 8]. This primitive topology would be processed with the offset-based technique, because the indices of this primitive topology are examined in groups of three (which is more than one) to identify primitives.

The triangle strip topology 404 is a topology in which, after an initial three indices, each subsequent index forms a new triangle with the immediately previous two indices. Thus, the sequence of indices 0, 1, 2, 3, 4, 5 produces four triangles: triangle [0, 1, 2], triangle [1, 2, 3], triangle [2, 3, 4], and triangle [3, 4, 5]. This primitive topology would be processed with the non-offset-based technique, because each subsequent index in the sequence of indices has the possibility of creating a new primitive.

The line list topology 406 is a topology in which each sequence of two indices defines a different line. Thus, the sequence of indices 0, 1, 2, 3, 4, 5 defines three lines: line [0, 1], line [2, 3], and line [4, 5]. This primitive topology would be processed with the offset-based technique because the indices of this primitive topology are examined in groups of two.

The line strip topology 408 is a topology in which, after an initial two indices, each subsequent index forms a new line with the immediately previous index. Thus, the sequence of indices 0, 1, 2, 3, 4 produces four lines: line [0, 1], line [1, 2], line [2, 3], and line [3, 4]. This primitive topology would be processed with the non-offset-based technique because each subsequent index in the sequence of indices has the possibility of creating a new primitive. The line loop topology is the same as the line strip topology except that the last index connects to the first index.

The line list with adjacency topology 410 is a topology in which each sequence of four indices defines a different line. The second and third index of each sequence defines the line while the first and last index of each sequence define the adjacency of that defined line. The adjacency indices indicate "connectivity" of the line for use in geometry shading. Adjacency may be used in techniques such as silhouette detection, shadow volume extrusion, and other techniques. A sequence of indices 0, 1, 2, 3, 4, 5, 6, 7 produces two lines: line [1, 2] (with adjacent indices 0 and 3) and line [5, 6] (with adjacent indices 4 and 7). This primitive topology would be processed with the offset-based technique, because the indices of this primitive topology are examined in groups of four.

The triangle list with adjacency topology 412 is a topology in which each sequence of size indices defines a different triangle, along with adjacent indices. The first, third, and fifth indices define the vertices of the triangle. The second index defines the index adjacent to the first and third index. The fourth index defines the index adjacent to the third and fifth index. The sixth index defines the index adjacent to the first and fifth indices. A sequence of 0, 1, 2, 3, 4, 5, 6, 7, 8, 9, 10, 11 produces two triangles: [0, 2, 4] (with adjacent vertices 1, 3, and 5) and [6, 8, 10] (with adjacent vertices 7, 9, and 11). This primitive topology would be processed with the offset-based technique, because the indices of this primitive topology are examined in groups of four.

The line list with adjacency topology 414 is a topology in which, after an initial four indices, each subsequent index forms a line with adjacency with the immediately previous three indices. Thus, a sequence of 0, 1, 2, 3, 4, 5, 6, 7, 8 produces six lines with adjacency: line [1, 2] (with 0 and 3 as adjacent vertices), line [2, 3] (with 1 and 4 as adjacent vertices), line [3, 4] (with 2 and 5 as adjacent vertices), line [4, 5] (with 3 and 6 as adjacent vertices), line [5, 6] (with 4 and 7 as adjacent vertices), and line [6, 7] (with 5 and 8 as adjacent vertices). This primitive topology would be processed with the non-offset-based technique because each subsequent index in the sequence of indices has the possibility of creating a new primitive.

The triangle strip with adjacency topology 416 is a topology in which, after a first six vertices, every additional vertex can form a new triangle with adjacency with the immediately prior five vertices. Thus, a sequence of 0, 1, 2, 3, 4, 5, 6, 7, 8, 9 produces triangle 0, 2, 4 with adjacency 1, 3, and 6, a triangle 2, 4, 6, with adjacency 0, 5, and 8, and triangle 4, 6, 8, with adjacency 2, 7, and 9. In the triangle strip with adjacency topology 416, every two indices has the possibility of creating a new primitive, so the offset-based technique is used.

The quad list topology 418 is a topology in which each sequence of four indices forms a quad type primitive. Thus, indices 0, 1, 2, 3, 4, 5, 6, 7 produce quad [0, 1, 2, 3] and quad [4, 5, 6, 7]. This primitive topology would be processed with the offset-based technique, because the indices of this primitive topology are examined in groups of four.

The triangle fan topology 420 is a topology in which a first index serves as the first index for a subsequent sequence of indices. More specifically, the first three indices form a first triangle. A subsequent index forms a triangle with the first index and with the index immediately preceding the subsequent index. A second subsequent index forms a triangle with the first index and the index immediately preceding the second subsequent index. Thus, indices 0, 1, 2, 3, 4, 5 produce triangles [0, 1, 2], [0, 2, 3], [0, 3, 4], and [0, 4, 5]. This primitive topology would be processed with the non-offset-based technique because each subsequent index in the sequence of indices has the possibility of creating a new primitive.

The quad strip topology 422 is a topology in which, after the first four indices, every subsequent two indices produces a new quad primitive. Thus, the first four indices form a quad, the next two indices form a quad with the two indices preceding those next two indices, and so on. Thus, indices 0, 1, 2, 3, 4, 5, 6, 7 produce quads [0, 1, 2, 3], [2, 3, 4, 5], and [4, 5, 6, 7]. This primitive topology would be processed with the offset-based technique, because the indices of this primitive topology are examined in groups of two.

The polygon topology 424 is a topology in which a group of indices forms a single polygon. This topology is similar to the triangle fan topology 420 is converted to a series of triangles. This primitive topology would be processed with the non-offset-based technique because each subsequent index in the sequence of indices has the possibility of creating a new primitive.

A point list and patch topology, not shown, are processed using the non-offset-based technique. Other topologies not listed would use either the offset-based technique or the non-offset-based technique depending on whether each subsequent index creates a new primitive. The input assembler stage 302 determines whether to apply the offset-based technique or the non-offset-based technique based on whether each subsequent index creates a new primitive. More specifically, for primitive topologies in which each subsequent index creates a new primitive, the input assembler stage 302 uses the non-offset-based technique and for primitive topologies in which each subsequent index does not necessarily create a new primitive, the input assembler stage 302 uses the offset-based technique.

Depending on the primitive topology, one of the above techniques is applied to a sequence of indices to identify primitives from the indices. Reset indices in a sequence of indices affect the manner in which primitives are defined by those indices. Conceptually, and in general, reset indices define sections of indices from which primitives can be formed. Reset indices can also be thought of as "cutting" a stream of indices such that primitives can be formed on either side of the reset indices but not across the reset indices. Reset indices affect the manner in which primitives are defined by a stream of indices based on whether the primitive topology is a list type or a strip type.

For a list type, primitives are formed by non-overlapping sequences of indices and reset indices can therefore result in early termination of a sequence of indices that forms an incomplete primitive. For example, a sequence of indices of 1, 2, 3, 4, 5, R, interpreted as a triangle list, results in only one valid primitive: [1, 2, 3]. The reset primitive prevents indices 4 and 5 from being part of a valid primitive because: 1) the fact that these indices are being interpreted as a list type means that indices 4, and 5 cannot be joined with 3 to form another primitive; and 2) indices 4 and 5 are insufficient to form a primitive because the primitive topology—triangle type—requires 3 indices per primitive.

For a strip type, primitives are formed by overlapping sequences of indices and reset indices generally define the end of the sequence of indices from which primitives can be formed. For example, the same sequence above—1, 2, 3, 4, 5, R, interpreted as a triangle strip, would result in primitives [1, 2, 3], [2, 3, 4], and [3, 4, 5]. However, some strip types, such as a quad strip, require sequences of two indices such that some indices might not be able to be incorporated into a primitive. For example, the same sequence above, interpreted as a quad strip, would result only in primitive [1, 2, 3, 4]. No additional primitive could form, since primitive [3, 4, 5, R] is invalid due to including the reset primitive. The quad strip primitive topology precludes a quad from being formed from indices 2, 3, 4, and 5.

For both strip type and list type primitive topologies, if there is an insufficient number of indices between reset indices, then no primitive is formed with those indices. For example, a sequence of R, 2, R, interpreted as a triangle list, would result in no valid primitives, since the single index of 2 is insufficient to form a triangle.

FIGS. 5 and 6 describe the offset-based technique for identifying primitives from a set of indices based on primitive topology. FIG. 5 is a flow diagram of a method for, given a particular primitive topology, identifying primitives from a set of indices that may include reset indices, according to an example. Although described with respect to the system shown and described with respect to FIGS. 1-3, it should be understood that any system configured to perform the method, in any technically feasible order, falls within the scope of the present disclosure.

The method 500 accepts as input a chunk of indices received from an index buffer that describes primitives to be rendered by the graphics processing pipeline 134 and that may be filled by, for example, an application 126 executing on the processor 102. The method 500 also accepts as input an identification of a primitive topology that defines the manner in which the indices in the chunk of indices are interpreted to form primitives. In some examples, each chunk includes an equal number of indices retrieved from the index buffer. Further, each chunk may be processed in a fixed number of clock cycles (such as two), such that approximately the same number of indices are analyzed to identify primitives in a given number of clock cycles.

As shown, the method 500 begins at step 502, where the input assembler stage 302 divides the input chunk of vertices to form initial candidate primitives, based on the primitive topology. More specifically, the input assembler stage 302 determines what sets of indices could be primitives and identifies those indices as the initial candidate primitives. For primitive topologies where sets of indices that could be primitives do not overlap, the input assembler stage 302 identifies sequential sequences of indices of the size specified by the primitive topology as the initial candidate primitives. In one example, the primitive topology is triangle list. In a triangle list, the indices that form the triangles do not overlap. Thus, the input assembler stage 302 identifies sequential sequences of indices of three indices each, which represent the triangles of the triangle list, as the initial candidate primitives. For primitive topologies where the indices that can form primitives do overlap, the input assembler stage 302 identifies overlapping sequences of indices of the size specified by the primitive topology as the initial candidate primitives. In one example, the primitive topology is a quad strip. In this primitive topology, after the first two indices, every two additional indices form a new quad with the immediately previous two indices. In this situation, the input assembler stage 302 identifies overlapping sequences of four indices, spaced apart by two indices, as the initial candidate primitives. Note that this step does not care about the reset index. The initial candidate primitives can include reset indices, which are culled in later steps.

At step 504, the input assembler stage 302 identifies reset index locations in each of the initial candidate primitives. In each chunk, the indices are ordered from oldest index to newest index. Likewise, each initial candidate primitive has indices ordered from oldest to newest index. Step 504 involves identifying the location of the newest reset index in the initial candidate primitives that have reset indices. The "location" ranges from 0 to the S−1, where "S" is the size (number of indices in) of each initial candidate primitive. Thus, for a triangle list, the location ranges from 0 to 2. The newest index in an initial candidate primitive has the lowest location (i.e., 0) in this range and the oldest index in an initial candidate primitive has the highest location in this range. If an initial candidate primitive has a reset index, then the reset index location is the location of the newest reset index. Thus, if an initial candidate primitive has only one reset index, the location of the newest reset index is the location of the single reset index. If an initial candidate primitive has two or more reset indices, the location of the newest reset index is the lowest-numbered location out of the locations of the reset indices. If an initial candidate primitive does not have a reset index, then the reset index location is recorded as a special value, referred to herein as "X" or as a "no-reset-index" value.

At step 506, the input assembler stage 302 determines offsets for generating final candidate primitives based on the locations of the reset indices in the initial candidate primitives. More specifically, the input assembler stage 302 generates a final candidate primitive for each of the initial candidate primitives. The input assembler stage 302 assigns an offset to each final candidate primitive based on the reset index locations of the initial candidate primitives.

The manner in which offsets are assigned to a particular final candidate primitive depends on whether the initial candidate primitive that is one primitive older than the corresponding initial candidate primitive (also referred to as "the immediately prior initial candidate primitive") includes a reset index. A final candidate primitive corresponds to an initial candidate primitive if the two primitives are in the same ordered position in the chunk of indices (e.g., an oldest initial candidate primitive corresponds to an oldest final candidate primitive, a second oldest candidate primitive corresponds to a second oldest final candidate primitive, and so on). If the immediately prior initial candidate primitive includes a reset primitive, then the input assembler stage 302 assigns to the final candidate primitive the same offset value that is assigned to the final candidate primitive corresponding to the immediately prior initial candidate primitive. If the immediately prior initial candidate primitive does not include a reset primitive, then the input assembler stage 302 assigns, as the offset for the final candidate primitive, the location of the newest reset index of the immediately prior initial candidate primitive. For the oldest final candidate primitive of a chunk, the immediately prior initial candidate primitive is the newest initial candidate primitive of the previous chunk.

At step 508, the input assembler stage 302 identifies, from the chunk of indices, indices that belong in the final candidate primitives based on the determined offsets. The indices for each final candidate primitive comprise the indices of the chunk that correspond to the corresponding initial candidate primitive shifted in the "older" direction (e.g., towards the older indices in the chunk) by a number of indices equal to the offset assigned to that final candidate primitive. In one example, a chunk includes indices 0, R, 2, 3, 4, 5. The initial candidate primitives comprise [0, R, 2] and [3, 4, 5]. The reset index position for the first such primitive is 1 and the reset index position for the second primitive is X. The final candidate primitives comprise [0, R, 2] and, instead of [3, 4, 5], [2, 3, 4], since the offset for the second final candidate primitive is 1 (assigned from the first initial candidate primitive). This offset causes the position of indices for the final candidate primitive to be shifted towards the "older" end of the chunk by 1 position.

At step 508, the input assembler stage 302 removes the final candidate primitives that include a reset index. The final candidate primitives that remain are the primitives defined by the chunk of indices according to the specified primitive topology. Continuing with the above example, the final candidate primitive [0, R, 2] is removed since that is not a valid primitive. These final candidate primitives are provided to the world-space pipeline 304 for processing that uses primitive identification information, such as tessellation, the geometry shader, primitive culling, and the like.

FIG. 6 illustrates an example application of an offset-based technique for identifying primitives from a chunk of indices. A chunk of indices 602 is shown and includes indices 1, 2, 3, R, 5, 6, 7, R, 9, 10, 11, 12, 13, R, R, 16, 17, 18, 19, 20, 21, in order from oldest to newest (1 being oldest, 21 being newest). To begin (step 502), the input assembler stage 302 divides the chunk 602 to generate initial candidate primitives 604 based on the primitive topology of triangle list, in which each subsequent set of three indices forms a different triangle. Thus, the input assembler stage 302 generates initial candidate primitive 604(1), including indices [1, 2, 3], initial candidate primitive 604(2), including indices [R, 5, 6], initial candidate primitive 604(3), including indices [7, R, 9], initial candidate primitive 604(4), including indices [10, 11, 12], initial candidate primitive 604(5), including indices [13, R, R], initial candidate primitive 604(6), including indices [16, 17, 18], and initial candidate primitive 604(7), including indices [19, 20, 21].

Next (step 504), the input assembler stage 302 determines the newest location for reset indices in each of the initial candidate primitives 604. Initial candidate primitive 604(1) has no reset index and therefore gets assigned "X" as the reset index location. Initial candidate primitive 604(2) has a newest reset index at location 2. (Indices 5 and 6 are at location 1 and 0, respectively.) Thus, initial candidate primitive 604(2) is assigned "2" as the reset index location. Initial candidate primitive 604(3) has a newest reset index at location 1 and thus is assigned "1" as the reset index location. Initial candidate primitive 604(4) has no reset index and is thus assigned reset index location "X." Initial candidate primitive 604(5) has two reset indices, but the newest reset index is at location 0. Thus initial candidate primitive 604(5) is assigned reset index location "0." Initial candidate primitive 604(6) and initial candidate primitive 604(7) both have no reset indices and are thus assigned reset index location "X." The assignment of reset index locations by hardware can be accomplished with appropriate logic gates such as comparators or the like.

A series of multiplexers 608 are used to identify offsets for final candidate primitives 614. A different 2:1 multiplexer 608 is provided for, and corresponds to, a different one of the initial candidate primitives 604 and thus to a different one of the final candidate primitives 614. Each multiplexer 608 selects an offset value to forward to an immediately subsequent multiplexer 608, from the reset index location for the initial candidate primitive 604 associated with the multiplexer 608 and the offset value received from the immediately prior multiplexer 608. The selection is based on whether the reset index location of the initial candidate primitive 604 associated with the multiplexer 608 is equal to X. If the reset index location is equal to X, then the multiplexer 608 selects for forwarding the value from the immediately previous multiplexer 608. For the oldest initial candidate primitive 604 of a chunk, the immediately previous multiplexer 608 is the final multiplexer 608 of the previous chunk. If the reset index location is not equal to X, then the multiplexer 608 selects for forwarding the reset index location of the initial candidate primitive 604 associated with the multiplexer 608. A multiplexer 608 is associated with an initial candidate primitive 604 if the multiplexer 608 is in the same location in the sequence of multiplexers 608, as the initial candidate primitive 604 is in the sequence of initial candidate primitives 604. Thus, a first multiplexer 608(1) is associated with a first initial candidate primitive 604(1), a second multiplexer 608(2) is associated with a second initial candidate primitive 604(2), and so on.

In the example illustrated in FIG. 6, a first multiplexer 608(1) selects for forwarding the reset index location from the final multiplexer 608 of the final multiplexer of the previous chunk because the reset index location of the initial candidate primitive 604(1) is equal to X. A second multiplexer 608(2) selects the reset index location of the initial candidate primitive 604(2) (shown as 606(2)), equal to "2," for forwarding. A third multiplexer 608(3) selects the reset index location of the initial candidate primitive 604(3), equal to "1," for forwarding. A fourth multiplexer 608(4) selects the same value, "1." Fifth, sixth, and seventh multiplexers 608 select "0," "0," and "0" for forwarding, as shown.

The offset (shown in element 610) selected for any particular final candidate primitive 614 (step 506) is the reset index location received by the multiplexer 608 associated with that final candidate primitive 614, from the multiplexer 608 associated with the immediately preceding final candidate primitive 614.

In the example illustrated in FIG. 6, the offset for the first final candidate primitive 614(1) is the offset received from the immediately prior multiplexer 608. The offset for the second final candidate primitive 614(2) is the offset received from the immediately prior multiplexer 608(1), equal to "0" The third, fourth, fifth, sixth, and seventh offset values are "2," "1," "1," "0," and "0," respectively.

The input assembler stage 302 determines indices for the final candidate primitives 614 based on the offsets (step 508). More specifically, the indices for any particular final candidate primitive 614 are selected as the indices that would result if the corresponding initial candidate primitive 604 were shifted towards the older indices in the chunk 602 by the offset for the final candidate primitive 614.

In the example illustrated in FIG. 6, within the collection of indices 612 for the final candidate primitives 614, the first two final candidate primitives 614 include the same vertices as the corresponding initial candidate primitives 604 because the offsets for the first two final candidate primitives are "0." The third final candidate primitive 614(3) has offset of "2." Indices in the third final candidate primitive 614(3) are selected as the indices that would result by shifting the third initial candidate primitive 604(3) by a number of indices towards the older end of the chunk 602 equal to the offset of the third final candidate primitive 614(3). Thus, instead of [7, R, 9], the third final candidate primitive 614(3) has indices [5, 6, 7], obtained by shifting the "window" corresponding to the third initial candidate primitive 604(3) to the left by two indices. In a similar manner, the fourth final candidate primitive 614(4) has indices obtained by shifting the "window" of the fourth initial candidate primitive 604(4) to the left by one index (since the offset for the fourth final candidate primitive 614(4) is "1"), which includes indices [9, 10, 11]. The fifth final candidate primitive 614(5) also has indices obtained by shifting the window of the fifth initial candidate primitive 604(5) to the left by 1, to obtain [12, 13, R]. The sixth final candidate primitive 614(6) and the seventh final candidate primitive 614(7) have the same indices as the corresponding initial candidate primitives 604 because the offset values for those final candidate primitives 614 are 0.

The input assembler stage 302 examines each of the final candidate primitives 614 in a final candidate primitive collection 620 for chunk 602. Final candidate primitives 614 that include the reset index are discarded as invalid primitives 624. Final candidate primitives 614 that do not include the reset index are deemed to be output primitives 622 and are organized and forwarded to the world-space pipeline 304 for processing by parts of the world-space pipeline 304 that act on primitive information.

The offset-based technique can be performed in one or two computer clock cycles depending on whether the chunk 602 includes any reset primitives. If a chunk includes no reset primitives, then the initial candidate primitives 604 are deemed to be the output primitives 622 and can be forwarded to the world-space pipeline 304 for processing.

If there are reset primitives, then in some implementations, determining the reset index location in the initial candidate primitives 604 is done in a different clock cycle than identifying the indices in the final candidate primitives 614. Passing data through the multiplexers 608 is done serially, but 2:1 multiplexers can be implemented efficiently enough such that the total delay across all multiplexers 608 used for a chunk 602 is small enough to fit within a single clock cycle. The size of the chunks can be varied based on the primitive topology to ensure that the number of multiplexers 608 used does not exceed the time corresponding to a clock cycle.

Different primitive topologies that use the offset-based technique described with respect to FIGS. 5 and 6 are accommodated by adjusting the size of the initial candidate primitives 604 and final candidate primitives 614. For example, a line list would use candidate primitives having two indices, a quad list would use candidate primitives having four indices, and so on. For certain primitive topologies, candidate primitives can overlap. For example, a quad strip has four-index-sized candidate primitives, but these primitives can overlap (for example, input vertices 0, 1, 2, 3, 4, 5 produce quads [0, 1, 2, 3] and [2, 3, 4,]).

FIGS. 7 and 8 describe the non-offset-based technique for identifying primitives from a set of indices based on primitive topology. FIG. 7 is a flow diagram of a method for, given a particular primitive topology, identifying primitives from a set of indices that may include reset indices, according to an example. Although described with respect to the system shown and described with respect to FIGS. 1-3, it should be understood that any system configured to perform the method, in any technically feasible order, falls within the scope of the present disclosure.

As shown, the method 700 begins at step 702, where the input assembler stage 302 divides the indices based on the primitive topology to form candidate primitives. More specifically, for the primitive topologies that use the non-offset-based technique, an initial number of indices, where the number is based on the primitive topology, forms the first primitive. Then, each subsequent index forms a primitive with the immediately previous indices. In one example, the primitive topology is a triangle strip. In this primitive topology, the first three indices form a first triangle. A next index forms another triangle with the last two indices of the first triangle, and so on. The candidate primitives include all primitives identified in this manner.

At step 704, the input assembler stage 302 deletes all candidate primitives that include the reset index. The remaining candidate primitives are the final primitives that are output to the world-space pipeline 304 for processing.

In the example of FIG. 8, a chunk of indices 802 including indices 1, 2, 3, R, 5, 6, 7, R, 9, 10, 11, 12, 13, R, R, 16, 17, 18, 19, 20, and 21 is shown. The primitive topology in this example is a triangle strip. The input assembler stage 302 forms a first candidate primitive 806(1) from the first three indices [1, 2, 3]. The input assembler stage 302 forms a new candidate primitive for each subsequent index. Thus, the input assembler stage 302 forms a second candidate primitive 806(2) from indices [2, 3, R]. The third candidate primitive 806(3) includes indices [3, R, 5]. The fourth candidate primitive 806(4) includes indices [R, 5, 6]. The fifth candidate primitive 806(5) includes indices [5, 6, 7], and so on. The output primitives 808 include all of the candidate primitives 806 that do not include a reset vertex.

These output primitives 808 are transmitted to the world-space pipeline 304 for processing.

A method for identifying primitives from a set of indices is provided herein. The method includes identifying a primitive topology for the set of indices, wherein the primitive topology specifies a number of indices that are included in primitives. The method also includes identifying candidate primitives from the set of indices, the candidate primitives each including the number of indices that are included in primitives according to the primitive topology. The method further includes discarding candidate primitives that include a reset primitive to obtain output primitives. The method also includes forwarding the output primitives to a world-space pipeline for per-primitive processing.

An accelerated processing device is also provided. The accelerated processing device includes one or more shader engines and a graphics processing pipeline that includes a world-space pipeline and an input assembler stage. The input assembler stage is configured to identify primitives from a set of indices by identifying a primitive topology for the set of indices, wherein the primitive topology specifies a number of indices that are included in primitives, identifying candidate primitives from the set of indices, the candidate primitives each including the number of indices that are included in primitives according to the primitive topology, discarding candidate primitives that include a reset primitive to obtain output primitives, and forwarding the output primitives to a world-space pipeline for per-primitive processing.

A computer system is also provided. The computer system includes a processor and an accelerated processing device. The accelerated processing device includes one or more shader engines and a graphics processing pipeline that includes a world-space pipeline and an input assembler stage. The input assembler stage is configured to identify primitives from a set of indices by identifying a primitive topology for the set of indices, wherein the primitive topology specifies a number of indices that are included in primitives, identifying candidate primitives from the set of indices, the candidate primitives each including the number of indices that are included in primitives according to the primitive topology, discarding candidate primitives that include a reset primitive to obtain output primitives, and forwarding the output primitives to a world-space pipeline for per-primitive processing.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for identifying primitives from a set of indices, the method comprising:
identifying a primitive topology for the set of indices, wherein the primitive topology specifies a number of indices that are included in the primitives specified by the set of indices;
identifying initial candidate primitives from the set of indices, as groups of indices having a number of indices specified by the primitive topology;
determining offsets for the initial candidate primitives based on the locations of reset primitives in the initial candidate primitives;
determining output primitives based on the offsets, by shifting the initial candidate primitives by an amount specified by the corresponding offset; and
forwarding the output primitives to a world-space pipeline for per-primitive processing.

2. The method of claim 1, wherein, for an initial candidate primitive of the initial candidate primitives, determining the offset for that initial candidate primitive comprises:
determining the location of the newest reset primitive in the newest initial candidate primitive that includes a reset primitive and that is prior to the initial candidate primitive.

3. The method of claim 1, wherein determining the offsets for the initial candidate primitives comprises:
for each initial candidate primitive of the initial candidate primitives, selecting, for output by a multiplexer associated with the initial candidate primitive, either an offset value received from a multiplexer associated with an immediately previous initial candidate primitive, or the location of the newest reset primitive in the initial candidate primitive, based on whether the initial candidate primitive includes a reset primitive; and
determining, as the offset for the initial candidate primitive, the offset value received from the multiplexer associated with the immediately previous initial candidate primitive.

4. The method of claim 3, wherein determining the output primitives based on the offsets, by shifting the initial candidate primitives by an amount specified by the corresponding offset comprises:
identifying final candidate primitives as the indices at the location in the set of indices that coincides with the location of the initial candidate primitives shifted by the offset value; and
discarding final candidate primitives that include a reset primitive to obtain the output primitives.

5. The method of claim 1, wherein:
the primitive topology also specifies that for the set of indices, a new primitive is not formed with each subsequent single index; and
the initial candidate primitives comprise non-overlapping groups of indices of the set of indices.

6. The method of claim 1, further comprising:
identifying whether the initial candidate primitives include the reset primitives and identifying the newest reset primitive locations for the initial candidate primitives that include reset primitives.

7. The method of claim 1, further comprising:
receiving the set of indices from a processor within an index buffer designated to include indices that define primitives to be rendered; and
receiving an indication of the primitive topology from the processor.

8. The method of claim 1, wherein the per-primitive processing comprises at least one of primitive culling, geometry shading, and tessellation.

9. An accelerated processing device ("APD"), comprising:
one or more shader engines; and
a graphics processing pipeline including:
a world-space pipeline; and
an input assembler stage configured to identify primitives from a set of indices by:
identifying a primitive topology for the set of indices, wherein the primitive topology specifies a number of indices that are included in the primitives specified by the set of indices;
identifying initial candidate primitives from the set of indices, as groups of indices having a number of indices specified by the primitive topology;
determining offsets for the initial candidate primitives based on the locations of reset primitives in the initial candidate primitives;
determining output primitives based on the offsets, by shifting the initial candidate primitives by an amount specified by the corresponding offset; and
forwarding the output primitives to a world-space pipeline for per-primitive processing.

10. The APD of claim 9, wherein the input assembler stage is further configured to, for an initial candidate primitive of the initial candidate primitive, determine the offset for that initial candidate primitive by:
determining the location of the newest reset primitive in the newest initial candidate primitive that includes a reset primitive and that is prior to the initial candidate primitive.

11. The APD of claim 9, wherein the input assembler stage is configured to determine the offsets for the initial candidate primitives by:
for each initial candidate primitive of the initial candidate primitives, selecting, for output by a multiplexer associated with the initial candidate primitive, either an offset value received from a multiplexer associated with an immediately previous initial candidate primitive, or the location of the newest reset primitive in the initial candidate primitive, based on whether the initial candidate primitive includes a reset primitive; and
determining, as the offset for the initial candidate primitive, the offset value received from the multiplexer associated with the immediately previous initial candidate primitive.

12. The APD of claim 11, wherein the input assembler stage is configured to determine the output primitives based on the offsets, by shifting the initial candidate primitives by an amount specified by the corresponding offset by:

identifying final candidate primitives as the indices at the location in the set of indices that coincides with the location of the initial candidate primitives shifted by the offset value; and discarding final candidate primitives that include a reset primitive to obtain the output primitives.

13. The APD of claim 9, wherein:

the primitive topology also specifies that for the set of indices, a new primitive is not formed with each subsequent single index; and the initial candidate primitives comprise non-overlapping groups of indices of the set of indices.

14. The APD of claim 9, wherein the input assembler stage is further configured to:

identify whether the initial candidate primitives include the reset primitives and identifying the newest reset primitive locations for the initial candidate primitives that include reset primitives.

15. The APD of claim 9, wherein the input assembler stage is further configured to:

receive the set of indices from a processor within an index buffer designated to include indices that define primitives to be rendered; and receive an indication of the primitive topology from the processor.

16. The APD of claim 9, wherein the per-primitive processing comprises at least one of primitive culling, geometry shading, and tessellation.

17. A computer system, comprising:

a processor; and an accelerated processing device, including:

one or more shader engines; and a graphics processing pipeline including:

a world-space pipeline; and an input assembler stage configured to identify primitives from a set of indices received from the processor, by:

identifying a primitive topology for the set of indices, wherein the primitive topology specifies a number of indices that are included in the primitives specified by the set of indices;

identifying initial candidate primitives from the set of indices, as groups of indices having a number of indices specified by the primitive topology;

determining offsets for the initial candidate primitives based on the locations of reset primitives in the initial candidate primitives:

determining output primitives based on the offsets, by shifting the initial candidate primitives by an amount specified by the corresponding offset; and forwarding the output primitives to a world-space pipeline for per-primitive processing.

18. The computer system of claim 17, wherein the input assembler stage is further configured to, for an initial candidate primitive of the initial candidate primitive, determine the offset for that initial candidate primitive by:

determining the location of the newest reset primitive in the newest initial candidate primitive that includes a reset primitive and that is prior to the initial candidate primitive.

19. The computer system of claim 17, wherein the input assembler stage is configured to determine the offsets for the initial candidate primitives by:

for each initial candidate primitive of the initial candidate primitives, selecting, for output by a multiplexer associated with the initial candidate primitive, either an offset value received from a multiplexer associated with an immediately previous initial candidate primitive, or the location of the newest reset primitive in the initial candidate primitive, based on whether the initial candidate primitive includes a reset primitive; and determining, as the offset for the initial candidate primitive, the offset value received from the multiplexer associated with the immediately previous initial candidate primitive.

* * * * *